(12) United States Patent
Atsmon et al.

(10) Patent No.: US 10,083,613 B2
(45) Date of Patent: Sep. 25, 2018

(54) DRIVING SUPPORT

(71) Applicant: iOnRoad Technologies Ltd., Ramat-Gan (IL)

(72) Inventors: Alon Atsmon, Greenwich, CT (US); Dan Atsmon, Rehovot (IL); Ohad Akiva, Ramat-Gan (IL); Shani Koresh, Ramat-Gan (IL); Ram Dayan, Tel-Aviv (IL)

(73) Assignee: iOnRoad Technologies Ltd., Ramat-Gan (IL)

( * ) Notice: Subject to any disclaimer, the term of this patent is extended or adjusted under 35 U.S.C. 154(b) by 0 days.

(21) Appl. No.: 14/759,260

(22) PCT Filed: Jan. 6, 2014

(86) PCT No.: PCT/IL2014/050017
§ 371 (c)(1),
(2) Date: Jul. 6, 2015

(87) PCT Pub. No.: WO2014/106854
PCT Pub. Date: Jul. 10, 2014

(65) Prior Publication Data
US 2015/0356872 A1 Dec. 10, 2015

Related U.S. Application Data

(60) Provisional application No. 61/749,340, filed on Jan. 6, 2013, provisional application No. 61/753,004, filed (Continued)

(51) Int. Cl.
*G01C 21/26* (2006.01)
*B60K 35/00* (2006.01)
(Continued)

(52) U.S. Cl.
CPC ............... *G08G 1/22* (2013.01); *B60K 35/00* (2013.01); *G01C 21/26* (2013.01); *G08G 1/012* (2013.01);
(Continued)

(58) Field of Classification Search
CPC .......... G08G 1/22; G01C 21/26; B60K 35/00
See application file for complete search history.

(56) References Cited

U.S. PATENT DOCUMENTS 5,708,427 A * 1/1998 Bush .................... G05D 1/0261
180/168
6,067,031 A 5/2000 Janky et al.
(Continued)

FOREIGN PATENT DOCUMENTS

| EP | 2469230 A1 | 6/2012 |
| GB | 2483094 | 2/2012 |

(Continued)

OTHER PUBLICATIONS

International Preliminary Report on Patentability dated Jul. 16, 2015 From the International Bureau of WIPO Re. PCT/IL2014/050017.
(Continued)

*Primary Examiner* — Yonel Beaulieu
*Assistant Examiner* — Martin A Weeks
(74) *Attorney, Agent, or Firm* — McCoy Russell LLP

(57) ABSTRACT

A method of calculating a commonly driven velocity recommendation, comprising: gathering a plurality of data messages from a plurality of client devices located in a plurality of different vehicles, each data message comprises a current location value, a current bearing value, and a current velocity value estimated for a hosting vehicle; clustering the plurality of data messages in a plurality of clusters by matching the respective location values and bearing
(Continued)

values; calculating a commonly driven velocity per cluster of the plurality of clusters by combining data from respective cluster members; and retrieving the commonly driven velocity in response to an indication of a current location and a current bearing thereof which matches location and bearing of members of the respective cluster.

15 Claims, 6 Drawing Sheets

Related U.S. Application Data on Jan. 16, 2013, provisional application No. 61/753,008, filed on Jan. 16, 2013, provisional application No. 61/760,093, filed on Feb. 3, 2013, provisional application No. 61/767,329, filed on Feb. 21, 2013.

(51) Int. Cl.
| | | |
|---|---|---|
| *G08G 1/00* | (2006.01) | |
| *G08G 1/01* | (2006.01) | |
| *G08G 1/052* | (2006.01) | |
| *G08G 1/056* | (2006.01) | |
| *G08G 1/0967* | (2006.01) | |
| *B60W 50/14* | (2012.01) | |

(52) U.S. Cl.
CPC ......... *G08G 1/0112* (2013.01); *G08G 1/0129* (2013.01); *G08G 1/0141* (2013.01); *G08G 1/052* (2013.01); *G08G 1/056* (2013.01); *G08G 1/096716* (2013.01); *G08G 1/096741* (2013.01); *G08G 1/096775* (2013.01); *B60K 2310/22* (2013.01); *B60W 2050/146* (2013.01)

(56) References Cited

U.S. PATENT DOCUMENTS

| | | | |
|---|---|---|---|
| 2005/0131597 A1 | 6/2005 | Raz et al. | |
| 2007/0262860 A1* | 11/2007 | Salinas | ................ G06Q 30/02 340/539.12 |
| 2008/0054072 A1 | 3/2008 | Katragadda et al. | |
| 2008/0183376 A1* | 7/2008 | Knockeart | ......... G01C 21/3415 701/119 |
| 2009/0326791 A1 | 12/2009 | Horvitz | |
| 2010/0094532 A1 | 4/2010 | Vorona | |
| 2010/0262489 A1* | 10/2010 | Salinas | ............. G06Q 30/0251 705/14.49 |
| 2010/0329513 A1* | 12/2010 | Klefenz | ................ G01C 21/00 382/104 |
| 2011/0117896 A1 | 5/2011 | Soelberg et al. | |
| 2012/0053754 A1 | 3/2012 | Pease et al. | |
| 2012/0059574 A1 | 3/2012 | Hada | |
| 2012/0242694 A1 | 9/2012 | Hotta et al. | |
| 2013/0226622 A1 | 8/2013 | Adamson et al. | |

FOREIGN PATENT DOCUMENTS

| | | | |
|---|---|---|---|
| JP | H0545171 A | 2/1993 | |
| JP | 2006038558 A | 2/2006 | |
| JP | 2006065391 A | 3/2006 | |
| JP | 2009059258 * | 9/2007 | ............... C08G 1/16 |
| JP | 2007257286 A | 10/2007 | |
| JP | 2007265292 A | 10/2007 | |
| JP | 2010515135 A | 5/2010 | |
| JP | 2011217116 A | 10/2011 | |
| JP | 2012137320 A | 7/2012 | |
| JP | 2012256138 A | 12/2012 | |
| WO | WO 2012/013228 | 2/2012 | |
| WO | WO 2014/106854 | 7/2014 | |

OTHER PUBLICATIONS

International Search Report and the Written Opinion dated Jul. 17, 2014 From the International Searching Authority Re. PCT/IL2014/050017.
Invitation to Pay Additional Fees Dated Apr. 24, 2014 From the International Searching Authority Re. PCT/IL2014/050017.
Communication Pursuant to Rules 70(2) and 70a(2) EPC Dated Sep. 27, 2016 From the European Patent Office Re. Application No. 14735176.1.
Notification of Office Action and Search Report dated Sep. 2, 2016 From the State Intellectual Property Office of the People's Republic of China Re. Application No. 201480012276.X and Its Summary in English.
Supplementary European Search Report and the European Search Opinion dated Sep. 9, 2016 From the European Patent Office Re. Application No. 14735176.1.
State Intellectual Property of the People's Republic of China, Office Action Issued in Application No. 201480012276.X, dated Jul. 3, 2017, 4 pages. (Submitted with English Summary).
Japan Patent Office, Office Action Issued in Application No. 2015-551254, dated Jan. 9, 2018, 10 pages.
State Intellectual Property Office of the People's Republic of China, Office Action Issued in Application No. 201480012276.X, dated Jan. 31, 2018, 4 pages. (Submitted with Partial Translation).

\* cited by examiner

DRIVING SUPPORT

RELATED APPLICATIONS

This application is a National Phase of PCT Patent Application No. PCT/IL2014/050017 having International filing date of Jan. 6, 2014, which claims the benefit of priority under 35 USC § 119(e) of U.S. Provisional Patent Application Nos. 61/767,329 filed on Feb. 21, 2013, 61/760,093 filed on Feb. 3, 2013, 61/753,008 filed on Jan. 16, 2013, 61/753,004 filed on Jan. 16, 2013 and 61/749,340 filed on Jan. 6, 2013. The contents of the above applications are all incorporated by reference as if fully set forth herein in their entirety.

FIELD AND BACKGROUND OF THE INVENTION

The present invention, in some embodiments thereof, relates to driving support systems and methods and, more specifically, but not exclusively, to driving support systems and methods which are based on movement data analysis and/or visual and audible signal analysis.

Various technologies for real time detection and estimation of risks at a vehicle surrounding and/or of driver's status, for example whether the driver is under a condition of safe driving, have been developed in the last years. Briefly, these technologies are effective means to prevent traffic accidents by alerting users in real time about risky situations such as line crossing, sleepy driving, and/or aside driving.

SUMMARY OF THE INVENTION

According to some embodiments of the present invention there is provided a method of calculating a commonly driven velocity recommendation, comprising: gathering a plurality of data messages from a plurality of client devices located in a plurality of different vehicles, each data message comprises a current location value, a current bearing value, and a current velocity value estimated for a hosting vehicle; clustering the plurality of data messages in a plurality of clusters by matching respective the location values and the bearing values; calculating a commonly driven velocity per cluster of the plurality of clusters by combining data from respective cluster members; and retrieving the commonly driven velocity in response to an indication of a current location and a current bearing thereof which matches location and bearing of members of a respective the cluster.

Optionally, the clustering includes: filtering the plurality of data messages to remove unnecessary data.

Optionally, the retrieving is done to one of the plurality of client devices.

According to some embodiments of the present invention there is provided a computer readable medium comprising computer executable instructions adapted to perform the method.

According to some embodiments of the present invention there is provided a method of generating and updating a commonly driven velocity dataset, comprising: hosting in a memory a dataset of a commonly driven velocity associated with a plurality of location points and bearing ranges; communicating with each of a plurality of velocity monitoring modules over a wireless connection to gather location, bearing and velocity data received from each of the plurality of velocity monitoring modules, each one of the plurality of velocity monitoring modules is hosted in one of a plurality of client devices; clustering the location, bearing and velocity data in clusters according to predefined parameters; processing the location, bearing and velocity data in the clusters to provide updated commonly driven velocity; and updating the commonly driven velocity associated with at least some of the plurality of location points and bearing ranges in the dataset according to the gathered location, bearing and velocity data.

Optionally, the method of also using the recommended velocity dataset, further comprises: receiving a current location and bearing of a client device; forwarding a local commonly driven velocity for a location point and bearing range corresponding with the current location based on the updated dataset to the first client device; and presenting the local commonly driven velocity to a user of the first client device.

Optionally, the predefined parameters include at least one of driver age, driver gender, vehicle type, recency, time of day and weather condition.

Optionally, the location, bearing and velocity data further include other data acquired by the one of a plurality of client devices.

Optionally, the dataset of a commonly driven velocity further includes for each location point and bearing range at least one of velocity distribution, mean velocity, average velocity and standard deviation of velocity.

Optionally, the client device is one of the plurality of client devices.

According to some embodiments of the present invention there is provided a method of using a commonly driven velocity dataset, comprising: receiving a current location and bearing of a client device; choosing a local commonly driven velocity associated with a location point and a bearing range corresponding with the current location and bearing based on a dataset of a commonly driven velocities; and forwarding the local commonly driven velocity to the client device; and presenting the local commonly driven velocity to a user of the first client device.

Optionally, the presenting includes an alert based on a current velocity of the client device and the local commonly driven velocity.

More optionally, the alert is one of audio alert, vibration and visual alert.

Optionally, the presenting includes an alert based on at least one of velocity distribution, mean velocity, average velocity and standard deviation of velocity.

According to some embodiments of the present invention there is provided a system of generating a commonly driven velocity dataset, comprising: a network node which manages a dataset of a commonly driven velocity associated with a plurality of location points and bearing ranges; and a plurality of velocity monitoring modules each: hosted in one of a plurality of client devices; records location, bearing and velocity data of the hosting client devices; and forwards the location and velocity data over a wireless connection to the network node; wherein the network node: gathers the location, bearing and velocity data from each of the plurality of velocity monitoring modules; and updates the dataset according to the gathered location, bearing and velocity data.

According to some embodiments of the present invention there is provided a method of generating a contour dataset, comprising: acquiring a plurality of landscape images each associated with a respective capturing location; creating from each one of the plurality of landscape images one of a plurality of contour images by identifying and documenting a contour of at least one route element depicted thereby, each one of the plurality of contour images being associated with the respective capturing location; and updating in a memory a contour image dataset by correlating between each of the plurality of contour images and one of a plurality of locations along a plurality of routes documented in a contour image dataset according to the respective capturing location.

Optionally, the creating of one of a plurality of contour images includes using a plurality of landscape images, each acquired from a different source.

Optionally, the plurality of contour images includes three dimensional contour data.

Optionally, the method for also using the contour dataset, further comprises: facilitating a retrieval of at least one of the plurality of contour images in response to a request indicative of a motion vector of one of a plurality of client devices along one of the plurality of routes.

More optionally, the at least one of the plurality of contour images is compressed before the retrieval.

More optionally, the plurality of client devices are a plurality of mobile devices each selected from a group consisting a Smartphone, a tablet, and a wearable computing device.

More optionally, the plurality of client devices is a plurality of infotainment units of a plurality of vehicles.

Optionally, the acquiring comprises capturing the plurality of landscape images by using a plurality of image sensors each installed in one of a plurality of client devices.

More optionally, the acquiring further comprises associating each one of the plurality of landscape images with a respective the capturing location.

More optionally, the associated capturing location is acquired from a respective the client device from the plurality of client devices.

More optionally, the capturing comprises communicating the plurality of landscape images from each of the image recording modules installed in the plurality of client devices to a network node over a wireless connection, the network node performs the creating, the updating, and the facilitating.

More optionally, the network node gathers the plurality of landscape images from the plurality of image recording modules each with the respective capturing location.

Optionally, an output of a non imaging sensor is associated with each of at least some of the plurality of landscape images; the output and a respective associated landscape image from the plurality of landscape images are captured in a related time frame.

More optionally, the output is analyzed to identify a vehicle road interaction.

More optionally, the creating comprises adding an indication about the vehicle road interaction to be presented in association with a respective the contour image.

More optionally, the output is an audio signal and the vehicle road interaction is selected from a group consisting of a bumper, lane marker having at least one trembling element, and a side wall.

Optionally, the plurality of contour images is rendered to be presented on an augmented reality display.

Optionally, the plurality of contour images is rendered to be projected on a windshield augmented reality display.

Optionally, the plurality of contour images is rendered to be displayed on a head-up display.

Optionally, the plurality of contour images is rendered to be embedded as a frame on a screen display.

Optionally, the plurality of landscape images acquired from a geographical dataset.

According to some embodiments of the present invention there is provided a method of using a contour dataset, comprising: receiving a request indicative of a motion vector and location of a client device along one of a plurality of routes; locating at least one of a plurality of contour images corresponding with the motion vector based on a contour image dataset documenting the plurality of routes; and forwarding the at least one of a plurality of contour images to the client device.

Optionally, the forwarding further includes at least one landscape image stored in the contour image dataset.

According to some embodiments of the present invention there is provided a system of generating a contour dataset, comprising: a plurality of image recording modules, each of the plurality of image recording modules is: hosted in one of a plurality of client devices; instructs the capturing of some of a plurality of landscape images by using an image sensor of the hosting client device and associates each of the some of the plurality of landscape images with a respective capturing location; at least one contour image generation module which creates from each one of the plurality of landscape images one of a plurality of contour images by identifying and documenting a contour of at least one route element depicted thereby, each one of the plurality of contour images being associated with a respective the associated capturing location; a memory which stores a contour image dataset geographically mapping a plurality of routes; a contour image updating module which updates the contour image dataset by correlating between each of the plurality of landscape images and one of a plurality of locations along the plurality of routes documented in the contour image dataset according to the respective capturing location; and a communication module which manages retrieval of at least one of the plurality of contour images in response to a request indicative of a motion vector along one of the plurality of routes.

According to some embodiments of the present invention there is provided a method of estimating a current revolutions per minute (RPM) measure of a motor of a vehicle, comprising: recording an output of at least one accelerometer which is mechanically connected to a vehicle having a motor during a monitoring period; analyzing the output to generate an RPM of the motor; estimating a current RPM of the vehicle.

Optionally, the method further comprises: identifying vehicle events using the current RPM.

Optionally, the method further comprises: estimating driver behavior measures using the current RPM and additional driver information.

Optionally, the method further comprises: triggering a data acquisition module according to the current RPM.

According to some embodiments of the present invention there is provided a system of estimating a current revolutions per minute (RPM) measure of a motor of a vehicle, comprising: at least one accelerometer; at least one mount for mechanically connecting the at least one accelerometer to a vehicle having a motor during a monitoring period; a processor; and a module which: instructs the processor to generate an RPM of the motor by an analysis of an output of the at least one accelerometer during the monitoring period; and estimates a current RPM of the vehicle.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
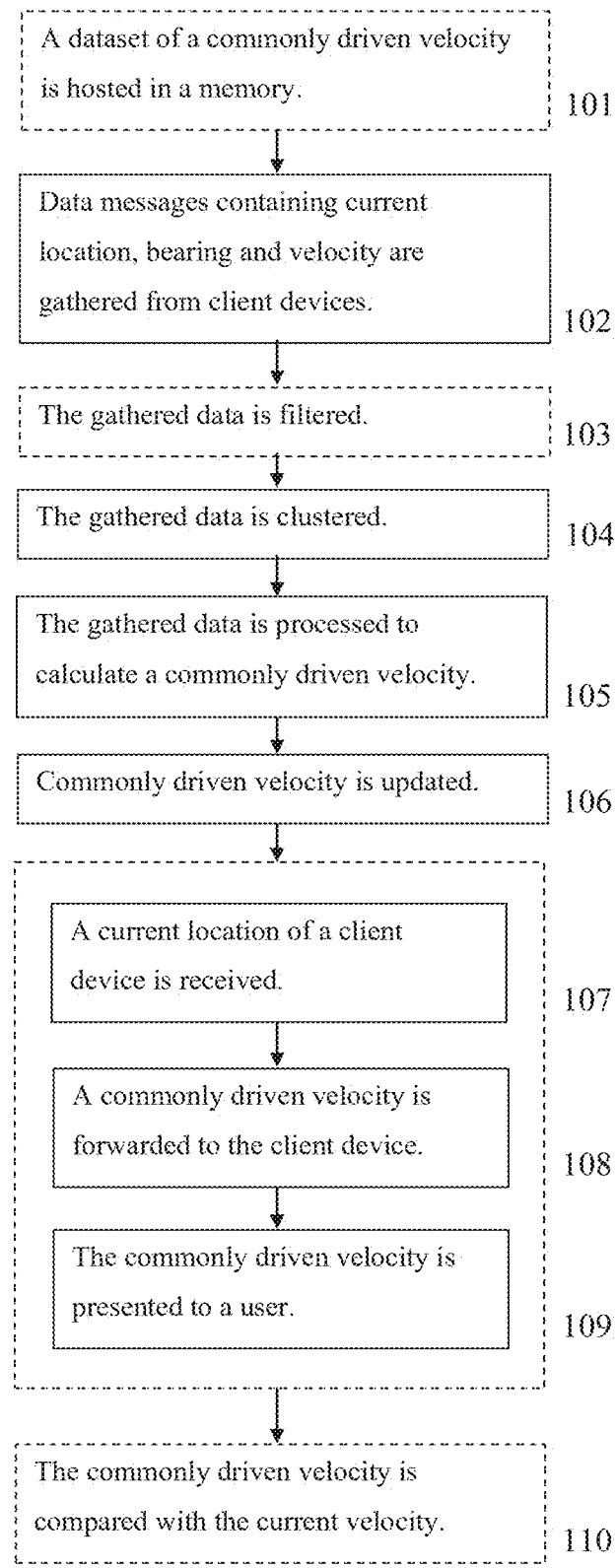
FIG. 1 is a flowchart schematically representing a method of generating, updating and/or using a commonly driven velocity dataset and/or calculating a commonly driven velocity, according to some embodiments of the present invention.

The present invention, in some embodiments thereof, relates to driving support systems and methods and, more specifically, but not exclusively, to driving support systems and methods which are based on movement data analysis and/or visual and audible signal analysis.

According to some embodiments of the present invention, data is collected by client devices, such as Smartphones and infotainment devices, analyzed to map driving support data and/or recommendations which are presented to a user, optionally by the client devices, when he or she are located in a respective location.

The client devices may be mobile devices, such as a Smartphone, a mobile phone, a tablet and/or a wearable device such as a head-up display or a band. The client devices may also be infotainment units of vehicles and/or vehicle add on(s) such as rearview mirror incorporated display.

According to some embodiments of the present invention, there are provided methods and systems of generating, updating and using a recommended velocity dataset and optionally using the recommended velocity dataset to provide real time driving support recommendation and/or alerts. A dataset of a commonly driven velocity associated with location points and bearing ranges is hosted in a memory of a network node. Location, bearing and velocity data received from velocity monitoring modules running on client devices is gathered by the network node, either by pulling or pushing update sessions. The gathered data is clustered and processed, and the commonly driven velocity is updated according to the processed location, bearing and velocity data. In use, a client device may then send its location and bearing and receives a recommended velocity for its current location point and bearing range and/or for an estimated location where he will be shortly according to the commonly driven velocities in the dataset, to be presented to a user such a driver of a car. In another embodiment, the recommended velocity is sent to the client device to allow alerting the user when he drives at a speed which is out of a range set around the recommended velocity estimated for his location.

According to some embodiments of the present invention, there are provided methods and systems of generating, updating and using a contour dataset and optionally using the contour dataset for providing night driving support. Landscape images, each associated with a respective capturing location, are acquired, for example by a camera of a client device and/or gathered from an image database, such as Google Earth™. A contour image associated with the respective capturing location is created from one or more respective landscape images by identifying and documenting the contour of route element(s) depicted in the landscape image(s), such as lane markings, signs and/or curbs. A contour image dataset is updated by correlating between each contour images and a location along routes documented in the contour image dataset. In use, a client device, being in motion along one of the routes, sends a request and receives contour images according to its motion, for instance motion vector. This may help a user of the client device, such as a driver of a car, when he is presented with the contour images, for instance on an augmented reality display, such as head-up display or on the windshield, to better navigate using the contours, when vision is not optimal such as at night and/or in fog.

According to some embodiments of the present invention, there are provided methods and systems of estimating one or more current revolutions per minute (RPM) measure(s) of a motor of a vehicle. Output of accelerometers mechanically connected to a motored vehicle is recorded and analyzed to generate an RPM of the motor. This allows an RPM measurement that is independent of the built-in systems of the vehicle. For example, RPM measurements may be used to identify accelerations, barking events, and malfunctions. The RPM measurements may be correlated with other data to estimate driver behavior measures, for instance correlated with GPS data, accelerometer data and/or the like. Additionally or alternatively, RPM measurements are used to trigger data recording, for instance by a GPS module and/or an image and/or a data processing action, for example to identify driving parameters from image analysis and/or GPS data. For instance an identification of an RPM change above or below a certain rate, an RPM change which may be indicative of trying to avoid an accident and/or drowsiness and/or a reckless driving, may trigger an image recording session. In such a manner, battery consumption may be reduced.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example, through the Internet using an Internet Service Provider.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
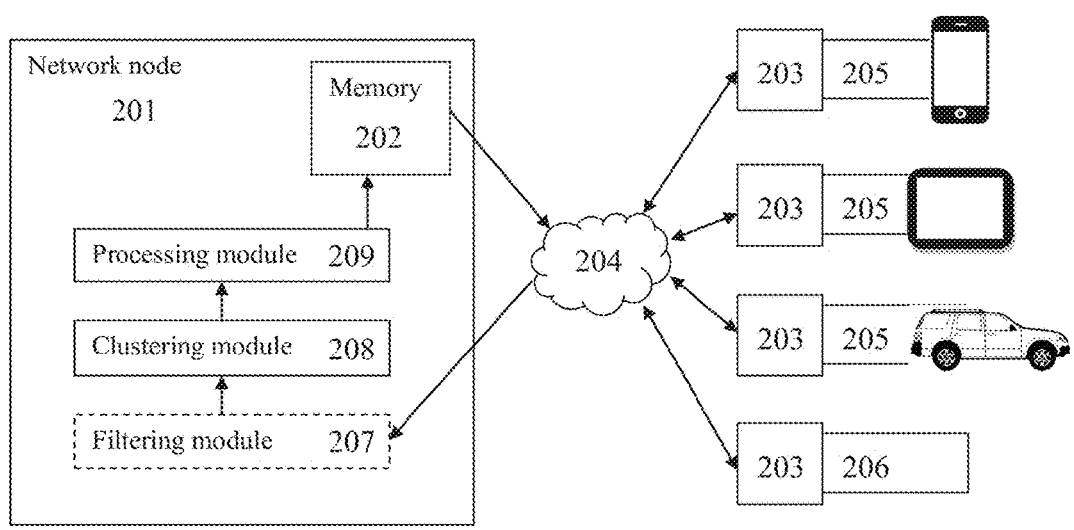
FIG. 2 is a schematic illustration of a system of generating, updating and/or using a commonly driven velocity dataset, according to some embodiments of the present invention.

Referring now to the drawings, FIG. 1 is a flowchart schematically representing a method of generating, updating and/or using a commonly driven velocity dataset and/or calculating a commonly driven velocity based on data gathered in real time from a plurality of client terminals, according to some embodiments of the present invention. Reference is also made to FIG. 2, which is a schematic illustration of a system of generating, updating and/or using a commonly driven velocity dataset, according to some embodiments of the present invention. The dataset is used to present a driver with a real-time recommended velocity according to his location.

First, optionally, as shown at 101, a dataset of a commonly driven velocity associated with location points and bearing ranges is hosted in a memory 202 of a network node 201. A bearing range is a range of driving directions, for example, 20-30 degrees relative to the north. Network node 201 may be, for example, a remote server computing device, personal computing device, and/or any other device that have sufficient processor and storage abilities to perform the tasks required by the system.

Optionally, memory 202 contains data of location points, each representing a location, and each location point includes a commonly driven velocity. Optionally, a commonly driven velocity is calculated for a group of location points. The location points data may include movement parameters of vehicles, for example, velocity distribution, standard deviation of velocity, average velocity, average acceleration, mean velocity and/or mean acceleration. The location points data may include road classification, such as highway, rural road, dirt road, country road, urban road, good/bad road condition, one way road or two way road and/or any other type of road. The location points data may include intersection classification, such as 3-way, T-junction, T intersection, fork, 4-way and/or roundabout. Optionally, the location points may also represent locations of interest where drivers have changed velocity or/and acceleration materially. Examples of location that may cause these types of changes are places where drivers slow down such as schools, speed traps, police posts, hospitals and/or crossroads.

Then, as shown at 102, communication is established to gather data messages, each containing a current location value, a current bearing value and a current velocity value of one of client devices 305 located in different vehicles. The data is acquired by velocity monitoring modules 203 each hosted in one of client devices 305. The data messages are sent to network node 201 by each client device 305 over a wireless connection 204. The communication may be established either by pulling an update from client devices 305 or by pushing update sessions by client devices 305. Wireless connection 204 may be, for example wireless local area network (WLAN) protocol such as Wireless Fidelity (WiFi™), a wireless personal area network (WPAN) such as Bluetooth™ protocol and/or a cellular network. Each velocity monitoring modules 203 records current location value, current bearing value and current velocity value of a hosting client device 205, and the hosting client device 305 forwards a data message containing the values over a wireless connection to network node 201. Location, bearing and/or velocity data may be acquired, for example, by global positioning system (GPS), triangulation of cellular network, image recognition and/or any other locating method. Velocity data may also be acquired by vehicle controller area network (CAN) bus data and/or Wi-Fi networks.

Optionally, other information is also gathered from client devices 205, for example, compass azimuth, images, videos, time, date, weather and/or vehicle CAN bus data such as steering wheel angle, temperature, gas consumption, and/or acceleration. The information may be acquired by components of client devices 205, for example, camera, GPS, gyroscope, accelerometer, air/gas sensor, vehicle CAN bus, storage, processor and/or clock. The information may also be acquired from vehicle other systems such as breaks system, light system, signal system, wipers system and any other system available on the vehicle. The information may also be acquired from external sources such as maps, other client devices 205, other mobile applications, cellular towers and/or external databases.

Optionally, driver metadata is also gathered. The driver metadata may include, for example, driver's gender, driver's age and/or vehicle type such as motorcycle or private truck. The driver metadata may be supplied by the driver and/or may be extracted from external sources such as social networks, means of data mining, insurance company data and/or the internet.

Optionally, location, bearing, velocity and/or other data is recorded by client devices 205 and saved locally.

Optionally, as shown at 103, the gathered data is filtered to remove unnecessary data by filtering module 207. The filtering may be used to remove data points with non physical values, for example, speeds greater than 200 miles per hour (mph) and/or locations positioned at sea. The filtering may also be used to select certain part of the data for analysis, for example, data with certain speed values (e.g. 50-80 mph); data which is in a specific location, area, city, and/or country; data which is in a certain period of time such as the last hour, day and/or previous week; data which is in recurring periods of time such as 14:00 PM-15:00 PM each Sunday, holidays and/or a special events and/or any combination thereof. The filtering may also be performed based on driver metadata.

Then, as shown at 104, the gathered data from the data messages is clustered by clustering module 208 by matching the respective location values and bearing values. The clustering may be based on location, bearing, velocity, weather condition, vehicle type, driver metadata and/or any other gathered data or combination thereof. The clustering may be based on longitude and latitude ranges, for example, a cluster of longitude coordinate in the range 0-10 and latitude coordinate in the range 30-32 or a cluster of longitude coordinate in the range 12-15 and latitude coordinate in the range 30-32. The clusters may be based on bearing, for example, same bearing value, bearing in a certain range such as bearing direction of 20-30 degrees. The distinction between different bearing directions is due to the fact that different client devices 205 may travel in a specific location in different directions, for example on different roads, lanes and/or different direction of a junction.

Optionally, the clustering is based on a predetermined periods of time, for example, the past day, week and/or month. Optionally, the clustering is based on reoccurring time periods and/or events, for example, time of day, day/night, weekdays, weekends and/or seasons. Optionally, the clustering is based on recency of the data so recent data may have more weight in calculating the commonly driven velocity.

Optionally, the clustering is repeated, in order to create sub-clusters to the previously created clusters. For example, first clusters are computed based on latitude range 20-25 and longitude range 10-15 which may represent a wide area of 200 square kilometers and for each cluster, sub-clustering is done based on latitude range 20-22 and longitude range 10-12 which may represent an area of 40 square kilometers and the clustering process may be repeated to represent smaller areas. Optionally, specific data may be clustered into more than one group, for example, latitude and/or longitude ranges of various clusters are overlapping.

Then, as shown at 105, the gathered data in the clusters is processed by processing module 209 to calculate commonly driven velocity for each cluster represented by a location point. The processing is performed by combining data from the location, bearing and velocity values that are members of the cluster. The processing may include, for example, statistic calculation, Kalman filtering, noise filtering, convolution, distribution calculation, histogram calculation, estimation, correlation, neural networking, pattern recognition and/or any other mathematical process. Optionally, the processing includes calculating a histogram and selecting a threshold based on predefined percentile of the distribution. The processing may be performed in real time and/or at a later time. The processing may be performed on client devices 205 and/or on network node 201.

Then, as shown at 106, the commonly driven velocity of at least some of the location points and bearing ranges is updated according to the gathered location, bearing and velocity data. For example, a commonly driven velocity of a segment is initially 50 mph, and is updated to 52 mph.

Optionally, a temporary commonly driven velocity is updated, for example, when velocity is changed due to a temporary event, such as construction works on the road, an accident and/or a flooded road.

Optionally, the location points each representing a location and bearing are created and/or updated according to the clusters. The longitude and latitude of a location point may be calculate by an average of the all the longitude and latitude values of the data points which are included in the cluster and/or by any other statistical method. Optionally, more than one location point represents a location and bearing, and the location points are differentiated by other parameters according to the clustering parameters and/or filtering parameters.

Optionally, the commonly driven velocity of a location point and bearing range is updated according to the group of location points. Optionally, other movement parameters of drivers are calculated for the location points, for example, average/median velocity or acceleration, speed limit, and/or any function of velocity, acceleration and/or both. Optionally, interest location, road classification and/or intersection classification may be determined for a location point according to the movement parameters.

Optionally, the filtering, clustering and/or processing are repeated when new data is gathered. For example, when data is received from monitoring modules 203 of client devices 205 after filtering and clustering, the data is filtered and clustered with existing data to create new clusters and/or update existing clusters.

According to some embodiments of the present invention, a recommended velocity dataset is used.

Optionally, as shown at 107, a current location and a current bearing of a client device 206 are received by network node 201. Client device 206 may be one of client devices 205. The location may be acquired, for example, by GPS, cellular network, image recognition and/or any other locating method.

Then, optionally, as shown at 108, a local commonly driven velocity for a location point and bearing range corresponding with the current location and current bearing based on the updated dataset is forwarded to client device 206. Optionally, the commonly driven velocity is chosen from location points along that segment.

Optionally, the location points are chosen according to other parameters, such as bearing and/or driver metadata. Optionally, the commonly driven velocity is chosen from data stored locally on client device 206. Optionally, the commonly driven velocity is chosen for an estimated location where client device 206 will be short time, for example, 5, 10, 30 seconds, 1, 5, 10 minutes, and/or any shorter, longer or intermediate time.

Then, optionally, as shown at 109, the local commonly driven velocity is presented to a user of client device 206. Optionally, the local commonly driven velocity is presented on a display of client device 206, for example, on a mobile phone screen, tablet screen, infotainment screen, projected over vehicle windshield and/or vehicle dashboard, head-up display (HUD) and/or wearable computing device with a screen such as digital glasses. Optionally, other data and/or parameters are forwarded to and/or presented by client device 206. The presentation may include, for example, a visual indication such as a graph, a map and/or numbers, an audio indication such as alert and/or recorded human voice and/or any other indication.

Optionally, the commonly driven velocity is calculated for all segments of a route or part of a route. Optionally, a starting location and an ending location are received from the user of client device 206. Optionally, the route is received from navigation system such as mobile phone app and/or a system that is part of a vehicle infotainment system. Optionally, the route is determined by learning the user's behavior, for example, using the location and time of day to match a most probable route from previously collected data of the user of client device 206. Optionally, parts of a route are determined in real time according to the driving. Optionally, a next location point matching a future location of client device 206 is predicted according to the route. Optionally, the next location point predicted according to the current location and current bearing of client device 206.

Then, optionally, as shown at 110, the commonly driven velocity is compared with the current velocity of client device 206. Optionally, other data and/or parameters are also compared.

Optionally, an alert is presented to the user of client device 206 when the current velocity is higher, lower and/or related by any function to the commonly driven velocity and/or other movement parameters. For example, an alert is presented when current velocity is higher than the 80 percentile in the distribution and/or when current velocity is higher than the average velocity plus some multiple of the standard deviation. The alert may be, for example, a visual alert, an audio alert, vibration and/or a combination thereof. Optionally, an alert is presented when approaching a location of interest where drivers have changed velocity or/and acceleration materially. Optionally, an alert is presented when approaching a location of interest and current velocity is substantially higher then commonly driven velocity in the location. Optionally, an alert is presented when current speed is out of a range set around the recommended velocity estimated for the location.

Optionally, a visual representation is presented to the user of client device 206, such as a graph, bar and/or distribution of the velocities or/and accelerations.

Optionally, a visual representation contains a comparison between the commonly driven velocity and recent velocities of client device 206.

Figure 3:
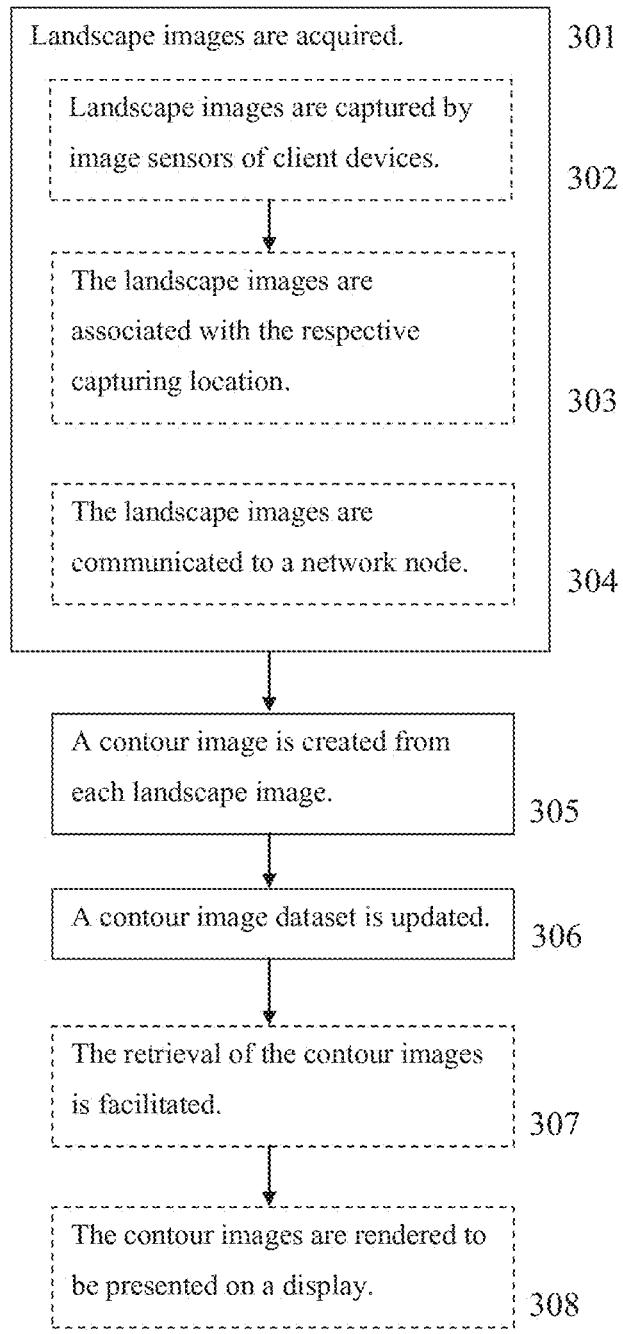
FIG. 3 is a flowchart schematically representing a method of generating, updating and/or using a contour dataset, according to some embodiments of the present invention.
Figure 4:
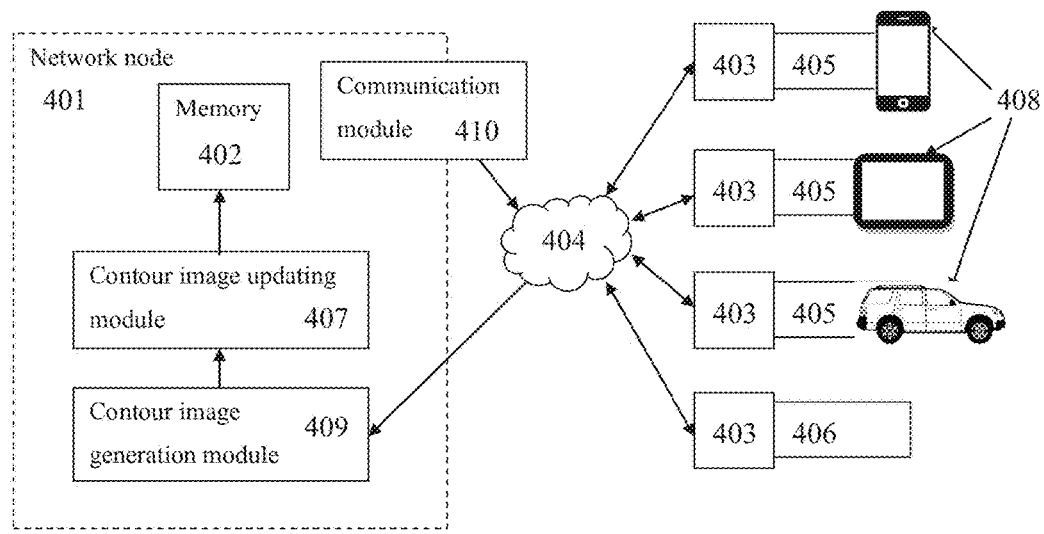
FIG. 4 is a schematic illustration of a system of generating, updating and/or using a contour dataset, according to some embodiments of the present invention.

Reference is now made to FIG. 3, which is a flowchart schematically representing a method of generating, updating and/or using a contour dataset based on data gathered from a plurality of client devices, according to some embodiments of the present invention. Reference is also made to FIG. 4, which is a schematic illustration of a system of generating, updating and/or using a contour dataset, according to some embodiments of the present invention. The contour images are presented to users for assisting them in navigation when vision conditions are poor, for example at night.

First, as shown at 301, landscape images, each associated with a respective capturing location, are acquired. The images may be acquired, for example, by client devices 405 during motion and/or from an external source such as online databases.

Optionally, as shown at 302, the landscape images are captured by using image sensors 408 of client devices 405, for example, a camera of a mobile phone and/or a video device of a vehicle. Optionally, the capturing of the landscape images is instructed by image recording modules 403, each hosted in one of client devices 405. Then, optionally, as shown at 303, each one of the landscape images is associated with the respective capturing location, for example, by geo-tagging, indexing and/or embedding location metadata to each landscape image. The capturing location may be acquired by any location means as described above. The capturing location may be acquired, for example, by a GPS, triangulation of cellular network or any other method.

Optionally, output(s) of one or more non imaging sensor(s) are also associated with each of some of the landscape images. The output may be any kind of data, for example, sound, bearing, compass azimuth, images, videos, time, date, weather and/or vehicle CAN bus data as described above. Optionally, the output and the respective associated landscape image are captured in a related time frame. Optionally, the output is analyzed to identify a vehicle road interaction. The vehicle road interaction may be, for example, a bumper, a lane marker with trembling elements and/or a side wall. The vehicle road interaction data may, for example, aid in identification of contour elements when creating the contour images and/or be presented to the user by way of alert.

Optionally, output of non imaging sensors gathered at a location of interest may be combined with landscape images of the location of interest taken from a different location. For example, a bumper identified by vibration caused to the vehicle when driving on the bumper may be used to identify the bumper in a landscape image taken before arriving to the bumper.

Optionally, output of non imaging sensors may be used to increase the accuracy of the capturing location, for example, by comparing to data acquired by GPS and/or known route structure on a map.

Optionally, the landscape images are acquired from an external source, for example, a geographical dataset such as Open Street Map and/or Google Maps™ images or videos from the internet such as Google street view and/or YouTube™, images or videos from security cameras, traffic cameras and/or other stationary or mobile cameras and/or any other source of road images or videos.

Optionally, as shown at 304, the landscape images are communicated from each of image recording modules 403 to a network node 401 over a wireless connection 404.

Optionally, network node 401 gathers the landscape images from image recording modules 403, each with the associated respective capturing location.

Optionally, the landscape images are stored in a memory 402. Then, as shown at 305, a contour image is created from each landscape image, by at least one contour image generation module 409, by identifying and documenting a contour of at least one route element depicted in the landscape image. Each contour image is associated with the respective capturing location. The route elements may by, for example, lane marking position and orientation, lane marking type (continues line, fragmented line etc), road and/or surroundings contour lines, bumpers, sharp turns, junctions, road crossings, traffic signs, traffic lights, curb stones, traffic islands, separation walls, fences and/or Bridges (overhead).

The contour images may be any kind of bitmap or vector image using any graphics file format, for example, portable network graphics (PNG), graphics interchange format (GIF), joint photographic experts group (JPEG), computer graphics metafile (CGM) and/or scalable vector graphics (SVG). Optionally, the contour images only contain data of the contours that may be rendered to an image.

Optionally, the landscape images may be compressed before being communicated. The compression may include any type of compression method, such as deflation, run-length encoding and/or transform coding.

Figure 5A:
FIG. 5A is an exemplary landscape image taken at night, according to some embodiments of the present invention.
Figure 5B:
FIG. 5B is FIG. 5A combined with an exemplary contour image created from the landscape images of the same location, according to some embodiments of the present invention.

Reference is now made to FIG. 5A, which is an exemplary landscape image taken at night and to FIG. 5B, which is FIG. 5A combined with an exemplary contour image created from the landscape images of the same location.

The contour images may be created in client devices 405 or in network node 401. A contour image dataset geographically mapping routes is stored in memory 402 and includes the contour images.

Optionally, each contour image is created from multiple landscape images. This may be performed by image processing algorithms, for example, by creating a contour of an object according to its mean location on different landscape images and/or by using landscape images of an object from different direction to generate an accurate contour. Optionally, the landscape images for creating a contour image are originated from multiple client devices 405 and/or other sources and integrated to create the contour image by contour image generation module 409. Optionally, the landscape images are captured at a proximate time. Optionally, newer landscape images are used to generate the most updated contour image.

Optionally, only some of the landscape images are processed to create contour images. Optionally, the landscape images are chosen to be used in processing according to usability and/or visibility, for example, images taken on daylight and/or good weather conditions, images with clear view of the horizon, images with no objects in view (such as cars, pedestrians, trucks etc) and/or high resolution images.

Optionally, the contour images include a three dimensional contour data. The three dimensional contours may be constructed using multiple landscape images of the same location from different angles.

Optionally, vibrations caused by driving and measured by sensors, such as accelerometers, may facilitate the capturing of landscape images of the same location from slightly different angle. For example, a video by a camera taking 120 frames per second combined with vibrations data from an accelerometer taking 1000 samples per second may be used to construct three-dimensional contour data by calculating the differences between two frames relative to the displacement of the camera measured using the vibrations data.

Optionally, the three-dimensional contour data is constructed using landscape images of the same location taken by different devices, such as mobile devices of drivers and/or systems of different vehicles, by calculating the differences between two or more landscape images relative to the displacement of the devices as measured by location elements such as GPS.

Optionally, the three-dimensional contour data is presented to a user using spectroscopic methods, such as presenting two offset two-dimensional images, one for each of the user's eyes.

Optionally, other data is extracted from the landscape images, such as orientation of a vehicle relative to the roadway and/or position of a vehicle in the lane.

Optionally, optimization on the contour images is performed to produce the best possible image quality. Optionally, landscape images of proximate location and/or similar bearing are used for the optimization. The optimization may include, for example, statistical methods such as Kalman filter and/or statistical prediction and/or any kind of mathematical process as described above.

Optionally, irrelevant objects that appear in the landscape image are removed by image processing when creating the contour image, for example, cars, trucks and/or pedestrians.

Then, as shown at 306, a contour image dataset is updated in memory 402 by a contour image updating module 407 by correlating between each of the contour images and a location along the routes documented in the contour image dataset according to the respective capturing location.

Optionally, contour image updating module 407 combines new contour images with contour images existing in the contour image dataset to create an updated contour images. Optionally, this is performed by optimization methods, as described above.

Optionally, multiple contour images correlated to one location are stored in the contour image dataset, for example, when intersecting roads are identified according to landscape images data such as bearing and/or when different lanes are identified.

According to some embodiments of the present invention, a contour image dataset is used.

Then, optionally, as shown at 307, the retrieval of at least one of the contour images is facilitated and managed by a communication module 410, in response to a request indicative of a motion vector and location of a client device 406 along one of the routes. The motion vector includes bearing and velocity of client device 406. The motion vector of client device 406 may be a result of any kind of motion by a user of client device 406, for example, driving a car, riding a bicycle and/or walking.

Optionally, the location of client device 406 at the time of sending the request is acquired by a GPS of client device 406. Optionally, the location is calculated in real-time by comparing landscape images taken by client device 406 at the time of sanding the request and contour images from the contour image dataset and finding the contour image most similar to the landscape images. Optionally, the calculation includes other data related to the landscape images and/or the contour images, such as bearing.

Optionally, the contour images may be compressed before being retrieved. The compression may include any type of compression method, as described for landscape images.

Optionally, landscape images may also be retrieved, for example, a landscape image taken earlier or in good light conditions and clear view.

Optionally, the contour image dataset is updated by a contour image updating module 407 according to new landscape images taken by client device 406 or any other source.

Optionally, as shown at 308, the contour images are rendered to be presented on an augmented reality display, projected on a windshield augmented reality display and/or displayed on wearable equipment such as digital glasses.

Optionally, contour images are presented as an embedded frame on a screen display, such as a display of a mobile phone or an infotainment.

Optionally, contour images are retrieved for all segments of a route or part of a route along the route map. The route may be determined in any method, as described above.

Optionally, the creating of the contour images, the updating of the contour image dataset, and/or the facilitating of the retrieval of contour images is performed by network node 401.

Figure 6A:
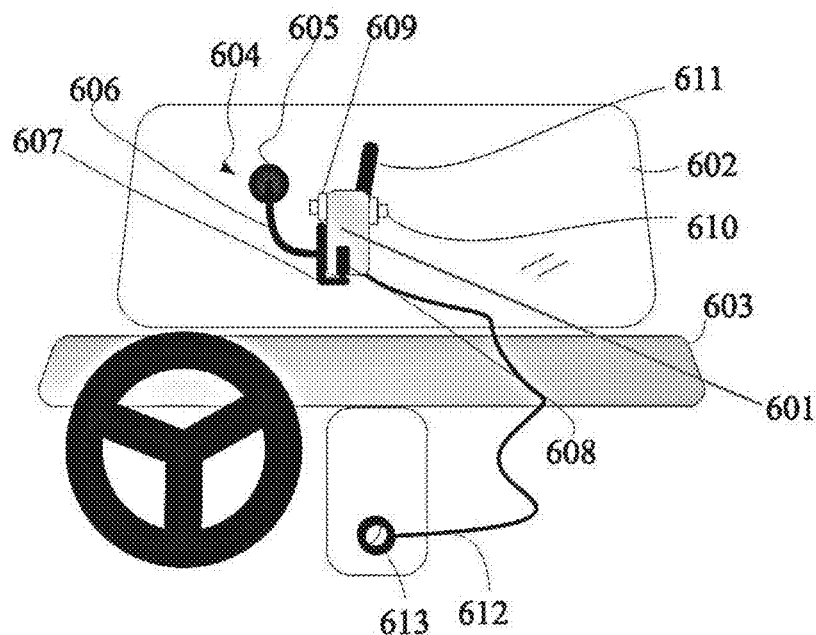
FIG. 6A is a schematic illustration of a front view of possible layouts of systems installed on a vehicle, according to some embodiments of the present invention.
Figure 6B:
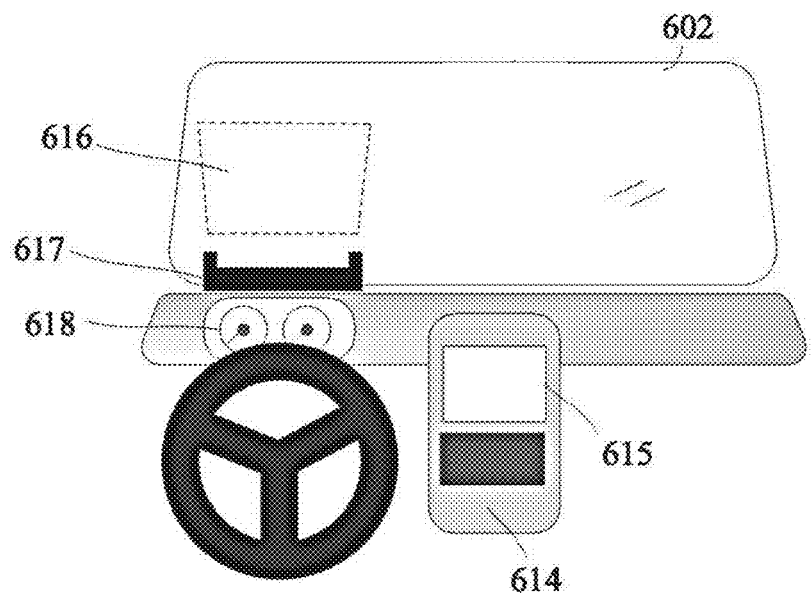
FIG. 6B is another schematic illustration of a front view of possible layouts of systems installed on a vehicle, according to some embodiments of the present invention.

Reference is now made to FIG. 6A and FIG. 6B, which are schematic illustrations of a front view of possible layouts of systems installed on a vehicle, according to some embodiments of the present invention.

The system may include a client device 601, such as a mobile phone or a tablet. Client device 601 may be held by vehicle mount 604 having an attachment unit 605 attached to windshield 602 or to dashboard 603 of the vehicle, such as vacuum cap or adhesive, an arm 606 connected to attachment unit 605 and a cradle 607 with side holders 608 that holds client device 601. Client device 601 may include cameras 609 and 610 for capturing landscape images. Client device 601 may also include a wireless communication module 611, such as an antenna. Client device 601 may be supplied with power by cable 612 from a vehicle lighter socket 613. The system may include a client device such as an infotainment 614.

Information such as commonly driven velocity and/or contour images may by presented on a screen of client device 601 or on screen 615 of infotainment 614. The information may also be embedded as an image or video 616 on windshield 602, on a HUD 617 or a dashboard display 618.

The presented information is based on data gathered in real time from a plurality of client devices such as client device 601 and analyzed to produce datasets of driver-assisting information.

Figure 7:
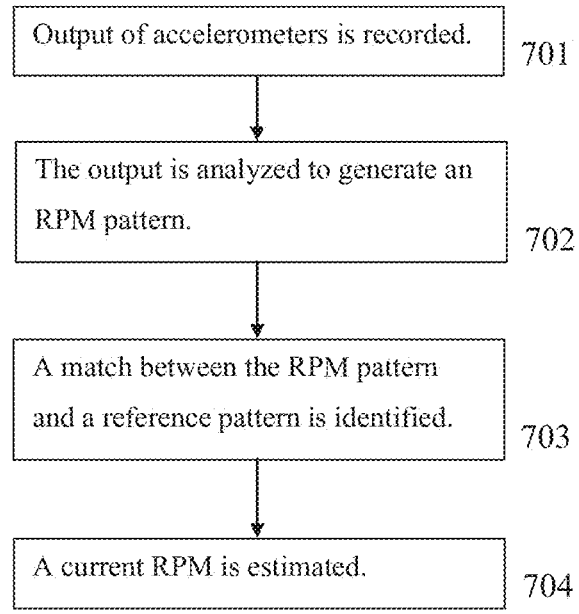
FIG. 7 is a flowchart schematically representing a method of estimating a current revolutions per minute (RPM) measure of a motor of a vehicle, according to some embodiments of the present invention.
Figure 8:
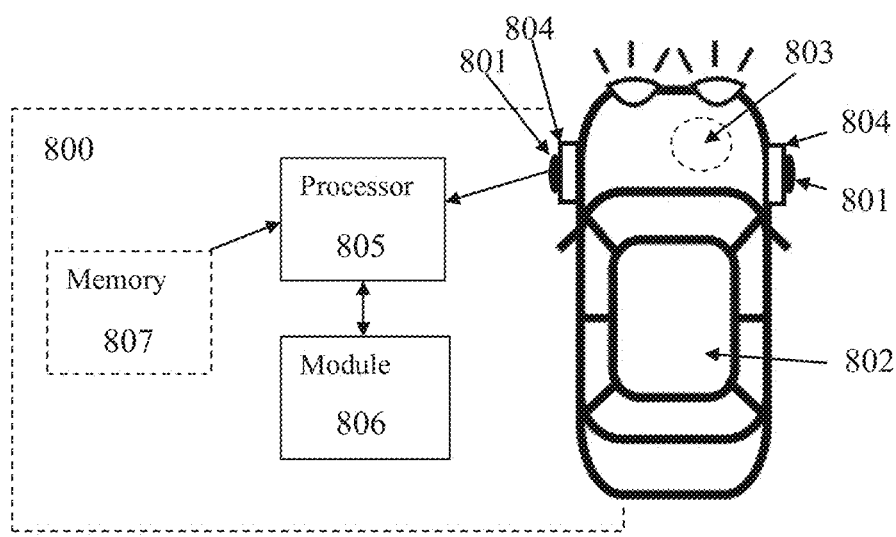
FIG. 8 is a schematic illustration of a system of estimating a current RPM measure of a motor of a vehicle, according to some embodiments of the present invention.

Reference is now made to FIG. 7, which is a flowchart schematically representing a method of estimating one or more current revolutions per minute (RPM) measure(s) of a motor of a vehicle, according to some embodiments of the present invention. Reference is also made to FIG. 8, which is a schematic illustration of a system of estimating a current RPM measure of a motor of a vehicle, according to some embodiments of the present invention.

First, as shown at 701, an output of accelerometers 801 is recorded by system 800. Accelerometers 801 are mechanically connected to a vehicle 802 having a motor 803 during a monitoring period. System 800 may include, for example, a mobile phone, an infotainment system of a dedicated hardware of vehicle 802 and/or an on-board diagnostics (OBD) system. System 800 may be located on the outside or the inside of vehicle 802.

Optionally, accelerometers 801 are mechanically connected to a vehicle 802 by mounts 804, for example, vacuum caps. Optionally, accelerometers 801 are attached to the windshield of vehicle 802 when accelerometers 801 are part of a mobile device.

Then, as shown at 702, the output is analyzed to generate an RPM of motor 803 by processor 805 instructed by module 806. The RPM is generated according to accelerations caused by vibration of motor 803. The analysis may include any mathematical process as described above, such as Fourier transform. Optionally, noise filtering and/or noise reduction are used to clear the output before analyzing.

Optionally, a match between an RPM pattern and a reference pattern is identified. The reference patterns are stored in a memory 807. The matching may include any mathematical process as described above, such as statistical algorithms.

Optionally, other patterns may be detected, for example, current gear state and/or events such as gear shifting.

Finally, as shown at 704, a current RPM of vehicle 802 is estimated according to the generated RPM. Optionally, RPM measurements are used to identify events, for example, accelerations, braking events and/or malfunctions.

Optionally, RPM measurements are correlated with other driver data to estimate driver behavior measures, for instance correlated with GPS data, accelerometer data and/or the like.

Optionally, RPM measurements are used to trigger data recording, for instance by a GPS module and/or an image and/or a data processing action, for example to identify driving parameters from image analysis and/or GPS data. For instance an identification of an RPM change above or below a certain rate, an RPM change which may be indicative of trying to avoid an accident and/or drowsiness and/or a reckless driving, may trigger an image recording session. In such a manner, data recording is only active when triggered, thus battery consumption may be reduced.

Optionally, the identifying of the match, the estimating and/or the triggering is performed by module 806.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant driving support systems and methods will be developed and the scope of the term driving support is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of calculating a commonly driven velocity recommendation, comprising:
at a network node, using at least one processor to execute code instructions for:
establishing a data communication over a wireless communication network with a plurality of client devices, each of said plurality of client devices located in a different one of a plurality of hosting vehicles;
receiving over said wireless communication network a plurality of data messages transmitted as a response to said establishing, from said plurality of client devices, wherein each of said plurality of data messages comprises a plurality of values acquired by at least one locating system of a respective hosting vehicle, said plurality of values including a current location value of said respective hosting vehicle, a current bearing value of said respective hosting vehicle, and a current velocity value estimated for said respective hosting vehicle;
accessing at least one external source to extract driver metadata on a driver of respective each of said hosting vehicles, said external source being at least one of social networks, insurance companies, and data mining sources;
clustering said plurality of data messages in a plurality of clusters based on said location values, said bearing values, and said driver metadata;
calculating, for each of said clusters, a commonly driven velocity representing a computation result based on a plurality of current velocity values, each of said plurality of current velocity values corresponding to one of a plurality of different vehicles hosting respective said client devices from which said received data messages are clustered in said respective cluster;
storing said clusters and said calculated commonly driven velocity in a memory accessible by said at least one processor;
receiving an indication of a current location and a current bearing thereof which matches location and bearing of members of a respective said cluster;
in response to said receiving, retrieving from said memory, said commonly driven velocity; and
transmitting said retrieved commonly driven velocity, over said wireless communication network to be presented to a user of a vehicle from which said indication was received.

2. The method of claim 1, wherein said clustering includes:
filtering said plurality of data messages to remove unnecessary data.

3. The method of claim 1, wherein said transmitting is done to one of said plurality of client devices.

4. A computerized system, comprising:
a network node;
a non-transitory computer readable medium comprising computer executable instructions executable by said network node, comprising:
instructions to establish a data communication over a wireless communication network with a plurality of client devices, each of said plurality of client devices located in a different one of a plurality of hosting vehicles;
instructions to receive over said wireless communication network, a plurality of data messages transmitted as a response to said establishing, from said plurality of client devices, wherein each of said plurality of data messages comprises a plurality of values acquired by at least one locating system of a respective hosting vehicle, said plurality of values including a current location value of said respective hosting vehicle, a current bearing value of said respective hosting vehicle, and a current velocity value estimated for said respective hosting vehicle;
instructions to access at least one external source and to extract driver metadata on a driver of respective each of said hosting vehicles, said external source is at least one of social networks, insurance companies, and data mining sources;
instructions to cluster said plurality of data messages in a plurality of clusters based on respective said location values, said bearing values, and driver metadata;
instructions to calculate, for each of said clusters, a commonly driven velocity representing a computation result based on a plurality of current velocity values, each of said plurality of current velocity values corresponding to one of a plurality of different vehicles hosting respective said client devices from which said received data messages are clustered in said respective cluster;
instructions to store said clusters and said calculated commonly driven velocity in a memory accessibly by said network node;
instructions to receive an indication of a current location and current bearing thereof which matches location and bearing of members of a respective said cluster;
instructions to retrieve from said memory, said commonly driven velocity, in response to said received indication; and
instructions to transmit said retrieved commonly driven velocity, over said wireless communication network, to be presented to a user of a vehicle from which said indication was received.

5. A method of generating and updating a commonly driven velocity dataset, comprising:
hosting in a memory, accessible by a network node device, a dataset of a commonly driven velocity associated with a plurality of location points and bearing ranges;
establishing by said network node a data communication over a wireless communication network with a plurality of velocity monitoring modules, each of said plurality of velocity monitoring modules hosted in one of a plurality of client devices each located in a different one of a plurality of hosting vehicles;
receiving by said network node device, over said wireless communication network, from each of said plurality of velocity monitoring modules a plurality of messages transmitted over said wireless communication network as a response to said establishing, said plurality of messages includes data acquired by at least one locating system of a respective hosting vehicle, said data comprises data on location, bearing, and velocity recorded by each of said plurality of velocity monitoring modules;

accessing at least one external source to extract driver metadata on a driver of said hosting vehicle from the at least one external source, said external source being at least one of social networks, insurance companies, and data mining sources;

clustering said location, bearing, and velocity data in clusters according to said driver metadata; and updating said commonly driven velocity associated with at least some of said plurality of location points and bearing ranges in said dataset according to said received location, bearing, and velocity data, and driver metadata;

wherein said commonly driven velocity representing a computation result based on a plurality of current velocity values, each of said plurality of current velocity values corresponding to one of said plurality of different vehicles each hosting one of said plurality of velocity monitoring modules and associated with respective one of said clusters.

6. The method of claim 5 further comprising:
receiving a current location and bearing of a client device;
forwarding a local commonly driven velocity for a location point and bearing range corresponding with said current location based on said updated dataset to said client device; and
presenting said local commonly driven velocity to a user of said client device.

7. The method of claim 5, wherein said driver metadata includes at least one of driver age, driver gender, and vehicle type.

8. The method of claim 5, wherein said location, bearing, and velocity data further include other data acquired by said one of a plurality of client devices.

9. The method of claim 5, wherein said dataset of a commonly driven velocity further includes, for each location point and bearing range, at least one of velocity distribution, mean velocity, average velocity, and standard deviation of velocity.

10. The method of claim 5, wherein said client device is one of said plurality of client devices.

11. A method of using a commonly driven velocity dataset, comprising:
establishing a data communication over a wireless communication network with a client device;
receiving over said wireless communication network a plurality of data messages transmitter as a response to said establishing from said client device, said plurality of data messages comprising data on a current location and a current bearing of said client device, acquired by at least one locating system of a vehicle hosting said client device;
accessing at least one external source to extract current driver metadata on a driver of said hosting vehicle, from the at least one external source, said external source being at least one of social networks, insurance companies, and data mining sources;
choosing a local commonly driven velocity associated with a location point, a bearing range, and predefined driver metadata corresponding with said current location, said current bearing, and said current driver metadata based on a dataset of commonly driven velocities;
forwarding said local commonly driven velocity to said client device; and
presenting said local commonly driven velocity to a user of said client device;
wherein said local commonly driven velocity representing a computation result based on a plurality of current velocity values, each of said plurality of current velocity values corresponding to one of a plurality of different vehicles calculated from data gathered on said plurality of different vehicles having a matching bearing value, a matching location value, and matching driver metadata as said current location, said current bearing, and said current driver metadata.

12. The method of claim 11, wherein said presenting includes an alert based on a current velocity of said client device and said local commonly driven velocity.

13. The method of claim 12, wherein said alert is one of an audio alert, a vibration, and a visual alert.

14. The method of claim 11, wherein said presenting includes an alert based on at least one of velocity distribution, mean velocity, average velocity, and standard deviation of velocity.

15. A system of generating a commonly driven velocity dataset, comprising:
a network node, comprising at least a processor and a memory, which stores a dataset of a commonly driven velocity associated with a plurality of location points, driver metadata, and bearing ranges; and
a plurality of client devices, each of said plurality of client devices having a processor that executes a code comprising:
code instructions for recording location, bearing, and velocity data of said at least one of said plurality of client devices, acquired by at least one locating system of a respective hosting vehicle hosting said at least one of said plurality of client devices; and
code instructions for transmitting a plurality of messages comprising said location, bearing, and velocity data over a wireless connection to said network node, as a response to an establishment of data communication with said network node;
wherein said network node:
establishes said data communication with each of said at least one of said plurality of client devices;
receives said plurality of transmitted messages through said data communication;
gathers from said received plurality of transmitted messages said location, bearing, and velocity data;
accesses an external source to extract driver metadata on a plurality of drivers of a plurality of respective hosting vehicles each hosting one of said plurality of client devices, said external source being at least one of social networks, insurance companies, and data mining sources;
clusters said location, bearing, and velocity data and said driver metadata in a plurality of clusters based on said location values, said bearing values, and said driver metadata;
calculates, for each of said clusters, a commonly driven velocity representing a computation result based on a plurality of current velocity values, each of said plurality of current velocity values corresponding to one of a plurality of different vehicles each hosting one of said at least one of said plurality of client devices associated with said respective cluster; and updates said dataset according to said gathered location, bearing, and velocity data and driver metadata.

* * * * *

UNITED STATES PATENT AND TRADEMARK OFFICE
CERTIFICATE OF CORRECTION

PATENT NO. : 10,083,613 B2
APPLICATION NO. : 14/759260
DATED : September 25, 2018
INVENTOR(S) : Alon Atsmon et al.

Page 1 of 1

It is certified that error appears in the above-identified patent and that said Letters Patent is hereby corrected as shown below:

In Claim 11, Line 54, correct "transmitter" to read "transmitted".

Signed and Sealed this
Sixth Day of November, 2018

Andrei Iancu
*Director of the United States Patent and Trademark Office*